United States Patent
Brunel et al.

(10) Patent No.: US 9,477,561 B2
(45) Date of Patent: Oct. 25, 2016

(54) GATEWAY FOR THE SURVIVABILITY OF AN ENTERPRISE NETWORK USING SIP

(71) Applicants: Sebastien Brunel, Colombes (FR); Laurent Barbero, Colombes (FR)

(72) Inventors: Sebastien Brunel, Colombes (FR); Laurent Barbero, Colombes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 511 days.

(21) Appl. No.: 14/021,491

(22) Filed: Sep. 9, 2013

(65) Prior Publication Data
US 2014/0012996 A1    Jan. 9, 2014

Related U.S. Application Data

(62) Division of application No. 14/000,714, filed as application No. PCT/EP2012/051060 on Jan. 24, 2012.

(30) Foreign Application Priority Data

Mar. 15, 2011 (EP) .................................... 11305279

(51) Int. Cl.
*G06F 11/00* (2006.01)
*G06F 11/20* (2006.01)
(Continued)

(52) U.S. Cl.
CPC ....... *G06F 11/2002* (2013.01); *H04L 65/1006* (2013.01); *H04L 65/1026* (2013.01);
(Continued)

(58) Field of Classification Search
CPC ............. H04L 29/08072; H04L 29/06; H04L 29/08576; H04L 29/0809; H04L 29/06095
USPC .......................................................... 714/227
See application file for complete search history.

(56) References Cited

U.S. PATENT DOCUMENTS 7,213,149 B2 * 5/2007 Mache ................ H04L 63/0442
380/259
7,394,803 B1 * 7/2008 Petit-Huguenin ... H04M 7/1205
370/352
(Continued)

FOREIGN PATENT DOCUMENTS

EP    1526697 A2    4/2005

OTHER PUBLICATIONS

A. Klimov, B2BUA With Survivability Feature; Draft-Klimov-Sipcore-B2BUA-Survivability-00, Internet Engineering Task Force, Internet Society 4, May 26, 2009, XP015062527.
(Continued)

*Primary Examiner* — Amine Riad
(74) *Attorney, Agent, or Firm* — Harness, Dickey & Pierce, P.L.C.

(57) ABSTRACT

In one embodiment, the gateway includes a trunk interface module (TI) for coupling the gateway to a trunk of the public network (PSTN), a media Server module (MS) coupled to an enterprise network, a transcoder module (TC), a call control module (CC), and a proxy module (PRO). The proxy module is configured to forward each SIP message received by the gateway, according to the IP address contained in a SIP Request-URI in this message. The SIP message is either sent to the Call Control module (CC) if this IP address is the address of the gateway, or to the data compression module (DC) if the IP address is the address of the main SIP Server (MSS). The proxy module is configured to add, in the latter case, its own IP address in Path header on each Register method; and, for each other SIP method sent to the main SIP Server (MSS), suppress its own IP address in the Route header. The gateway includes a management and configuration module (MC) configured to receive and store a rescue call number to be used for establishing the backup link (BL).

2 Claims, 12 Drawing Sheets

(51) Int. Cl.
  *H04M 3/42* (2006.01)
  *H04M 7/00* (2006.01)
  *H04Q 3/00* (2006.01)
  *H04L 29/06* (2006.01)

(52) U.S. Cl.
  CPC ....... *H04L65/1036* (2013.01); *H04L 65/1073* (2013.01); *H04M 3/42314* (2013.01); *H04M 7/0066* (2013.01); *H04Q 3/0025* (2013.01)

(56) References Cited

U.S. PATENT DOCUMENTS

| | | | | |
|---|---|---|---|---|
| 7,613,170 | B1* | 11/2009 | Grabelsky | H04L 12/5692 370/352 |
| 8,249,239 | B2* | 8/2012 | DeMent | H04M 3/42017 379/207.16 |
| 2005/0058123 | A1* | 3/2005 | Horiba | H04L 29/06 370/352 |
| 2005/0083911 | A1 | 4/2005 | Grabelsky et al. | |
| 2005/0111390 | A1* | 5/2005 | Kobayashi | |
| 2005/0238160 | A1* | 10/2005 | Sunstrum | H04M 7/0003 379/220.01 |
| 2006/0007915 | A1* | 1/2006 | Frame | H04M 7/0069 370/352 |
| 2006/0077955 | A1* | 4/2006 | Poustchi | H04L 29/06027 370/352 |
| 2006/0235980 | A1* | 10/2006 | Pote | H04L 29/06027 709/227 |
| 2006/0270392 | A1* | 11/2006 | Scott | H04M 1/2535 455/414.2 |
| 2006/0291400 | A1* | 12/2006 | Balasaygun | H04L 29/06 370/242 |
| 2007/0047571 | A1 | 3/2007 | Kandikonda et al. | |
| 2007/0253328 | A1* | 11/2007 | Harper | H04L 12/2602 370/219 |
| 2007/0254661 | A1* | 11/2007 | Chowdhury | H04W 8/14 455/436 |
| 2008/0049734 | A1* | 2/2008 | Zhakov | H04L 29/06027 370/352 |
| 2008/0075265 | A1 | 3/2008 | Khanchandani | |
| 2008/0098117 | A1 | 4/2008 | Fukuhara et al. | |
| 2008/0147801 | A1* | 6/2008 | Foti | H03M 7/3088 709/206 |
| 2008/0198997 | A1* | 8/2008 | Sterman | H04L 12/66 379/220.01 |
| 2009/0003535 | A1 | 1/2009 | Grabelsky et al. | |
| 2009/0287955 | A1* | 11/2009 | Matsumoto | H04L 12/4633 714/4.1 |
| 2010/0061228 | A1 | 3/2010 | Grabelsky et al. | |
| 2011/0051683 | A1* | 3/2011 | Ramankutty | H04W 36/0033 370/331 |
| 2011/0267986 | A1 | 11/2011 | Grabelsky et al. | |
| 2011/0273979 | A1 | 11/2011 | Grabelsky et al. | |
| 2012/0263280 | A1* | 10/2012 | Budd-Jack | H04M 3/5183 379/45 |
| 2014/0012996 | A1* | 1/2014 | Brunel | H04M 3/42314 709/227 |

OTHER PUBLICATIONS

Jens Fiedler, Reliable VOIP Services Using a Peer-To-Peer Intranet, Eight IEEE International Symposium on Multimedia, Dec. 1, 2006, pp. 121-130, XP031041773, ISBN: 978-0-7695-2746-8.
International Search Report PCT/ISA/210 for International Application No. PCT/EP2012/051060 Dated on Jan. 24, 2012.
Written Opinion PCT/ISA/237 for International Application No. PCT/EP2012/051060 Dated on Jan. 24, 2012.

* cited by examiner

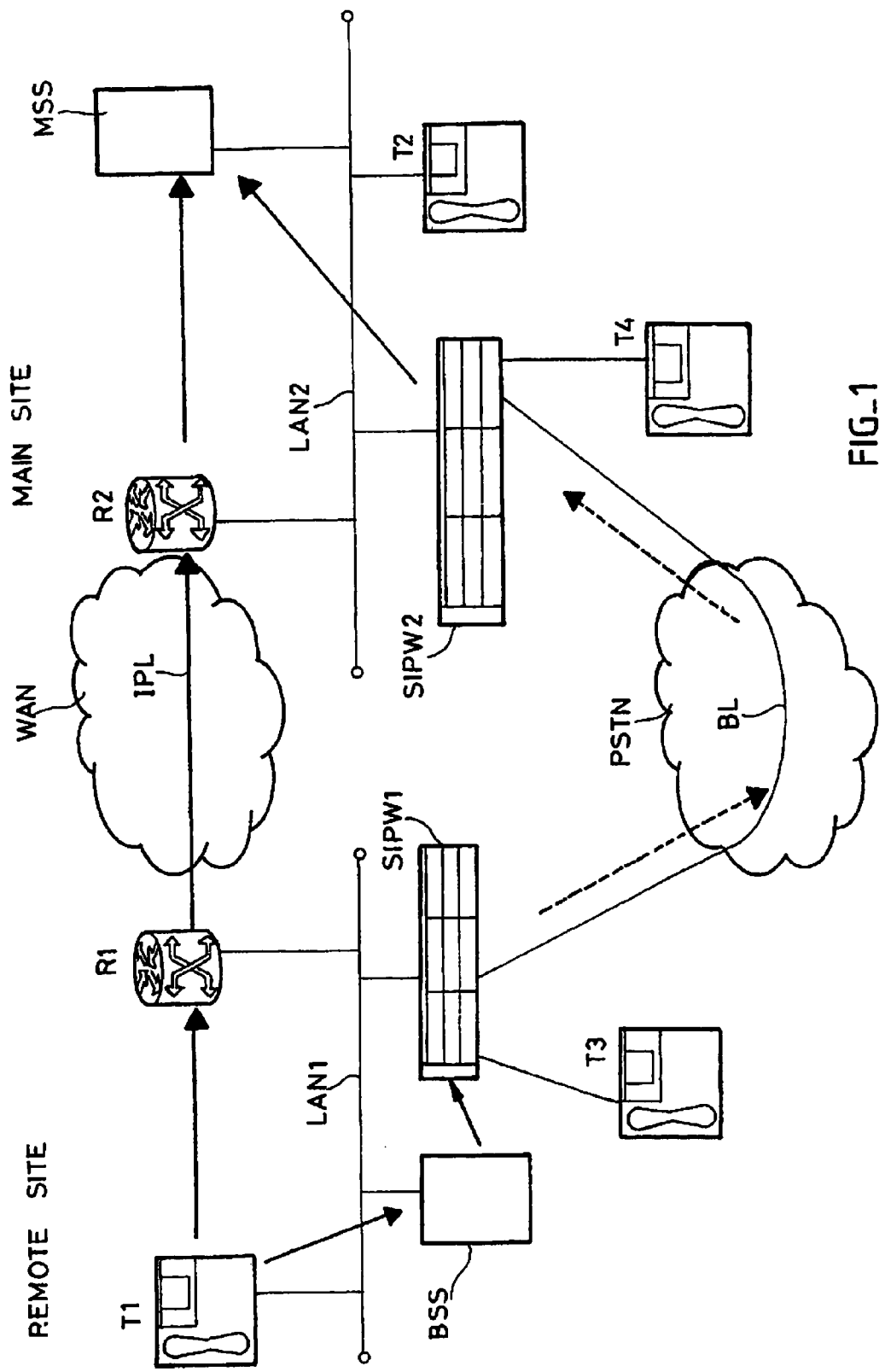
FIG_1

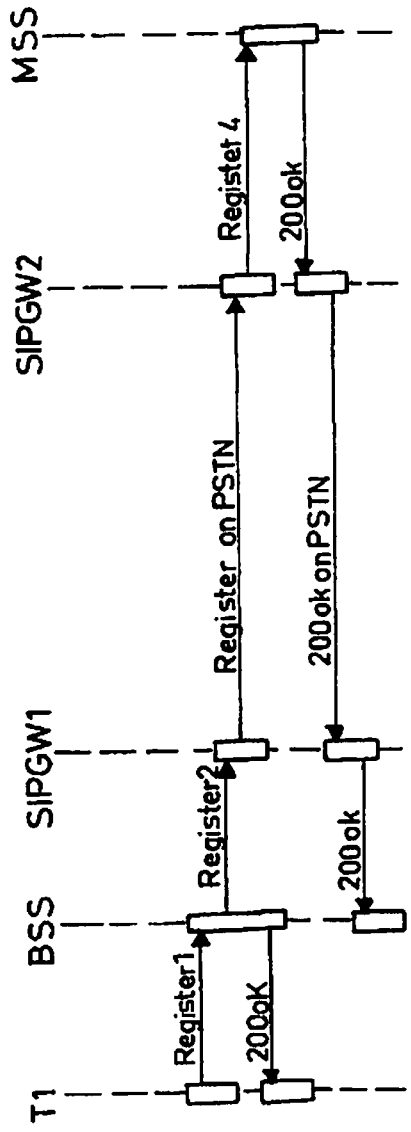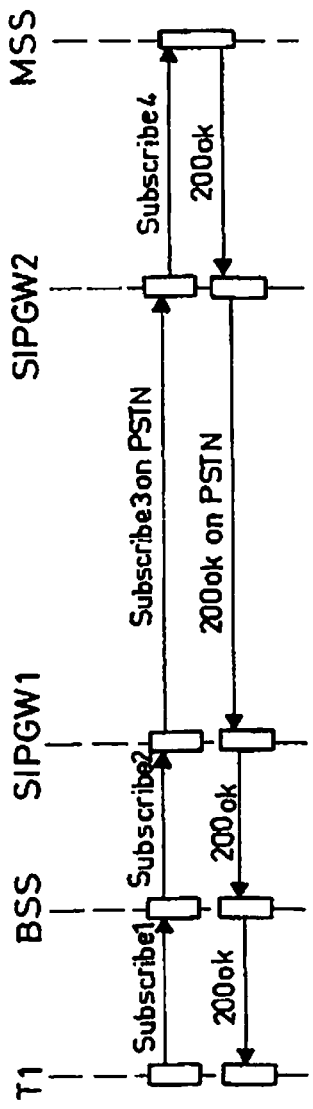
FIG_2
FIG_3

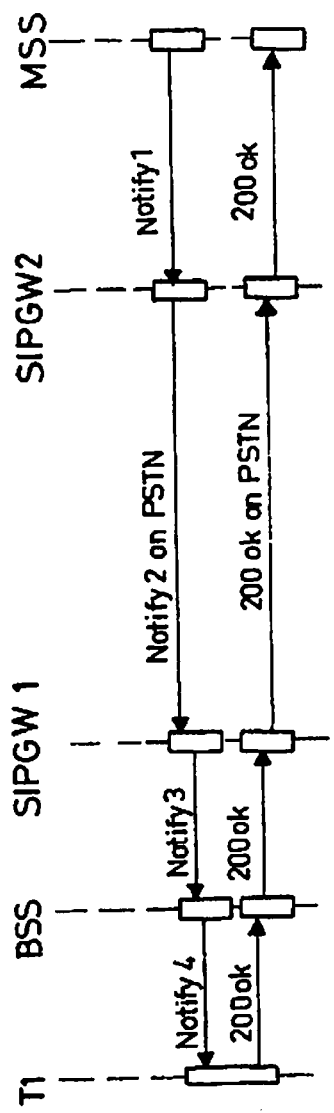
FIG_4
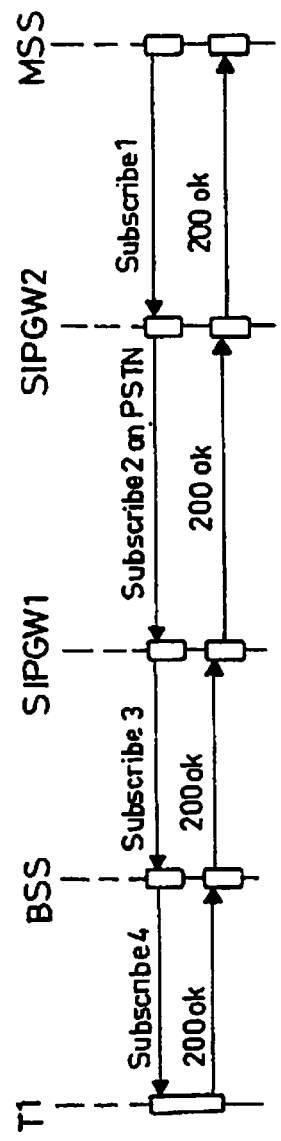
FIG_5

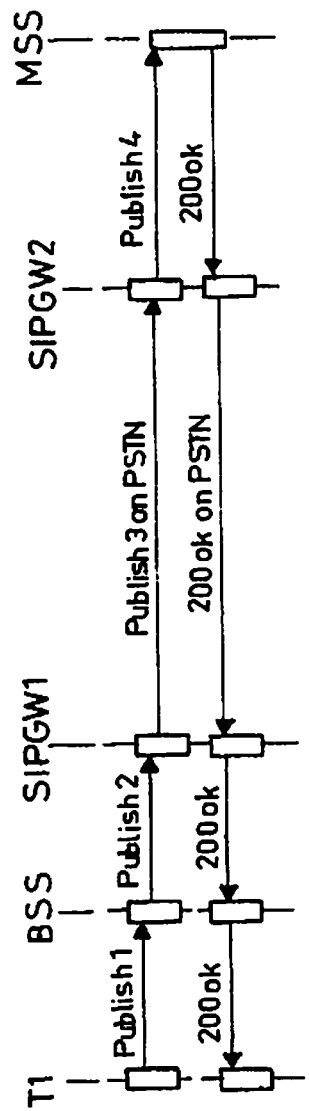
FIG_6

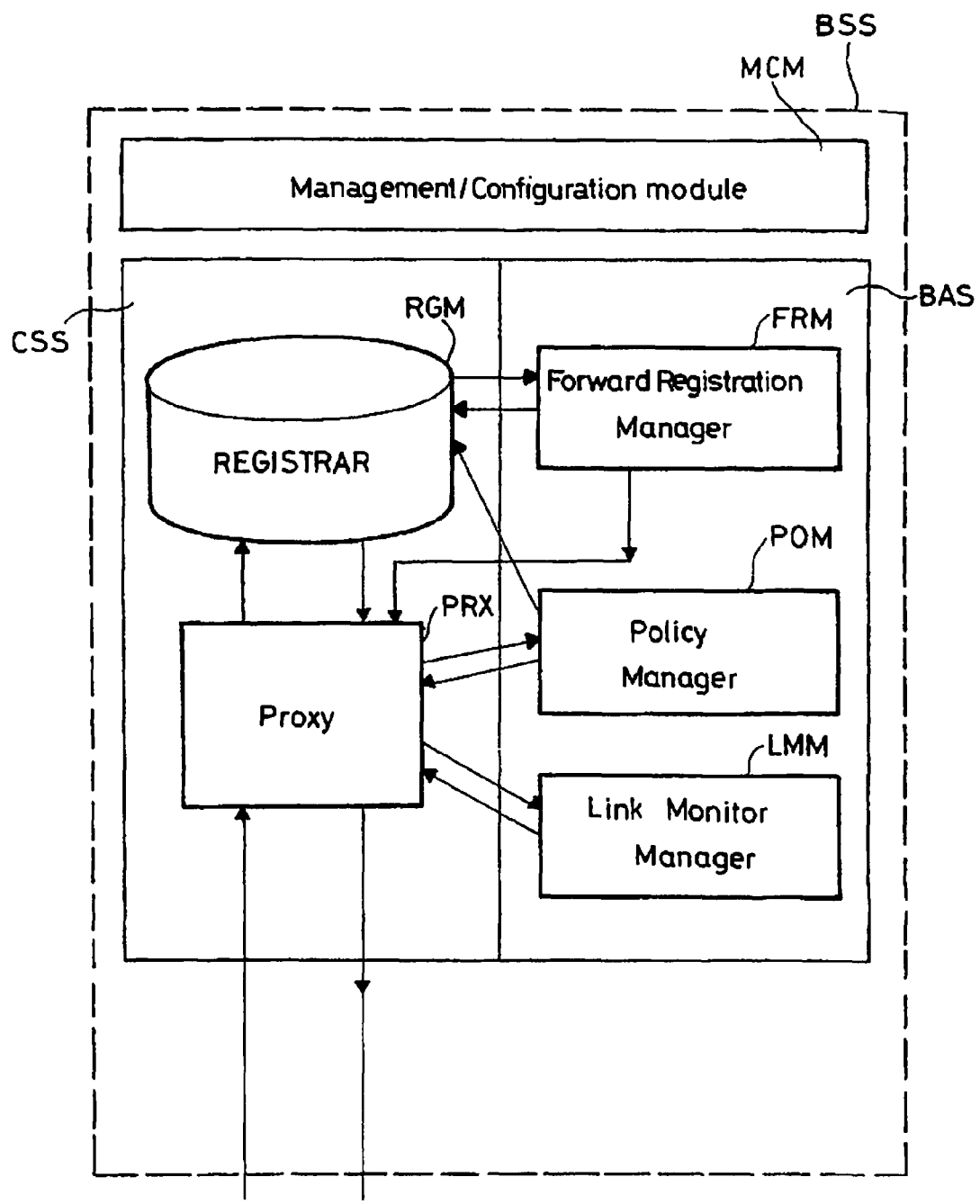
FIG_7

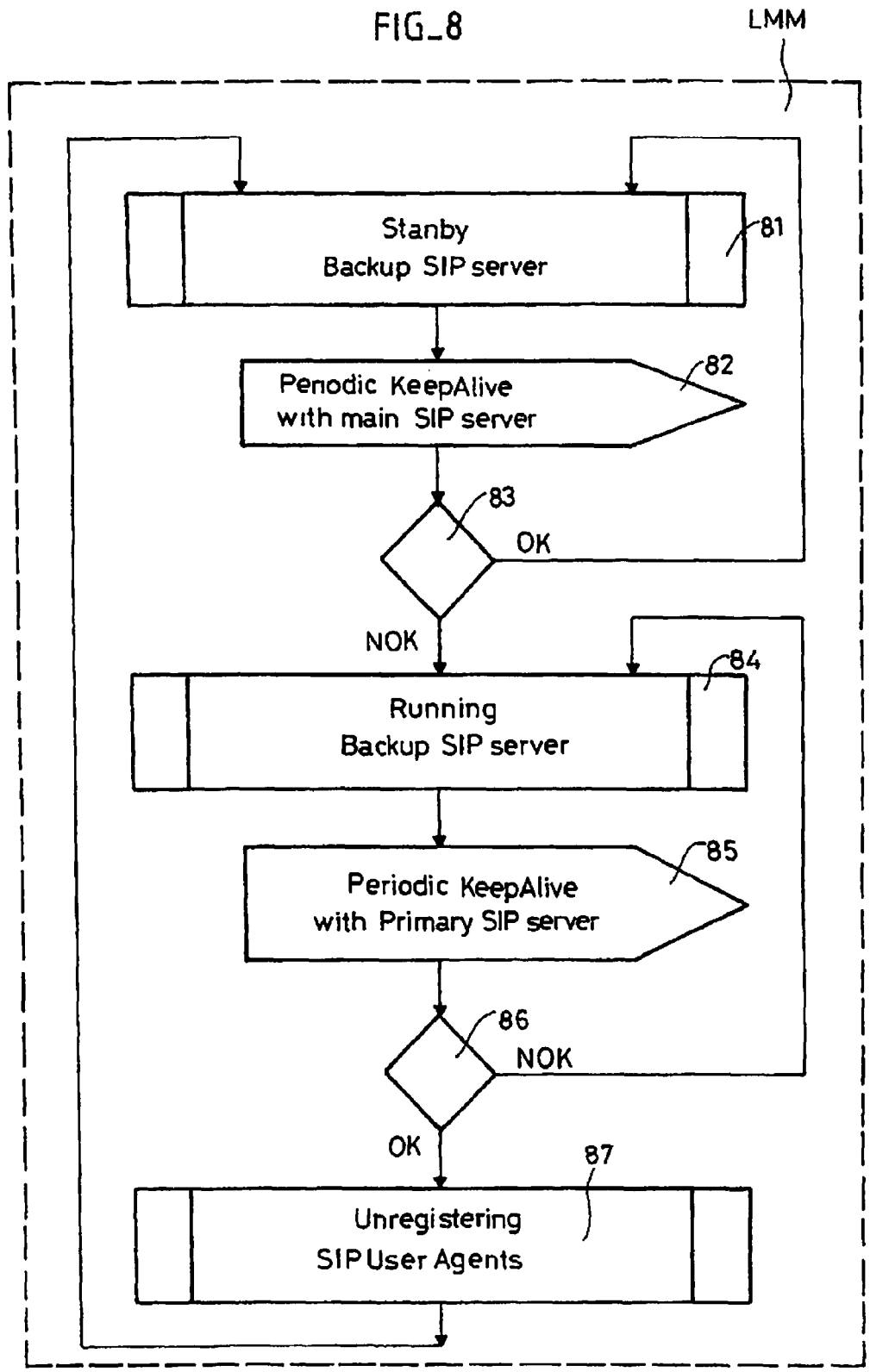

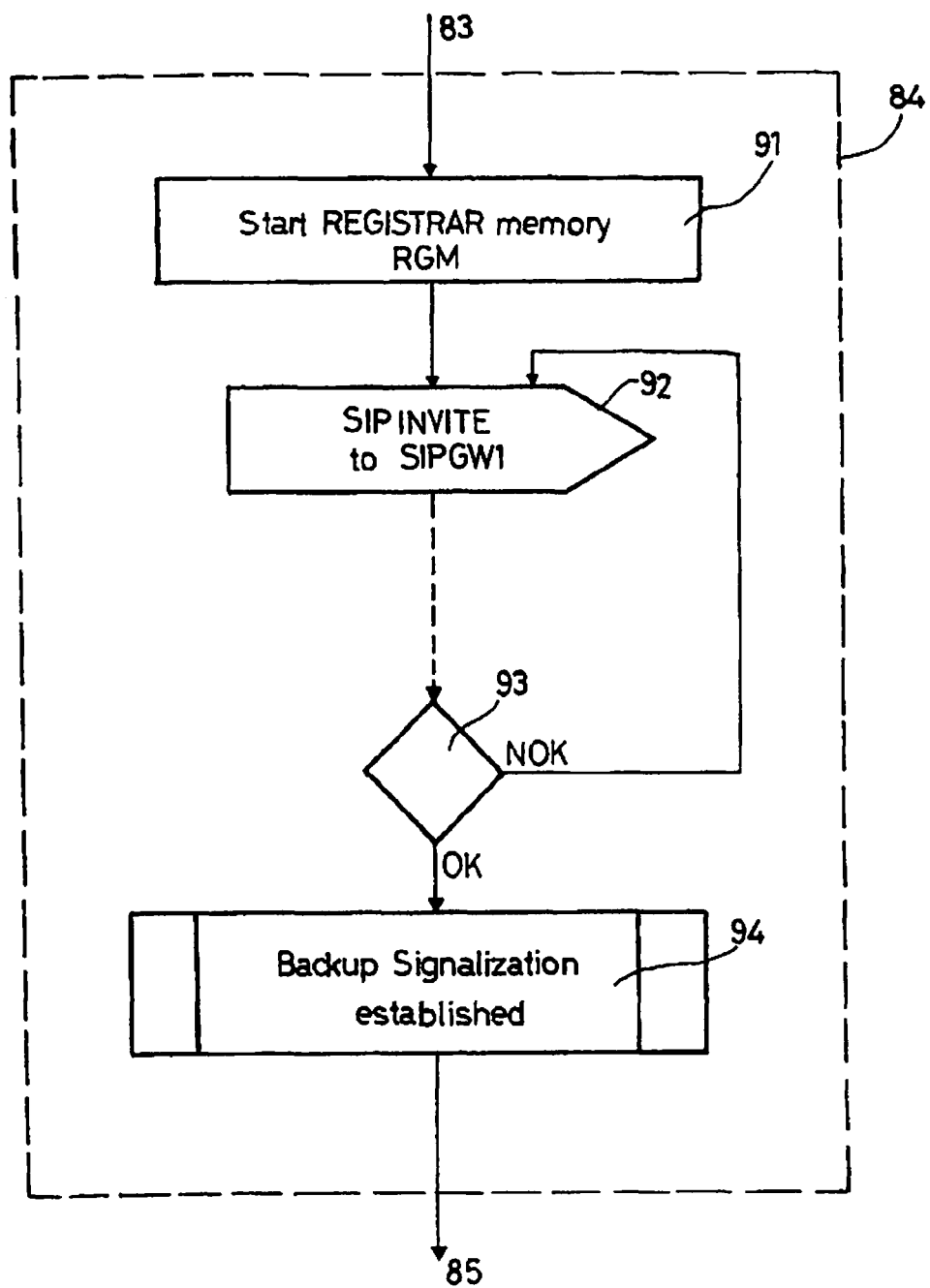
FIG_9

FIG_10
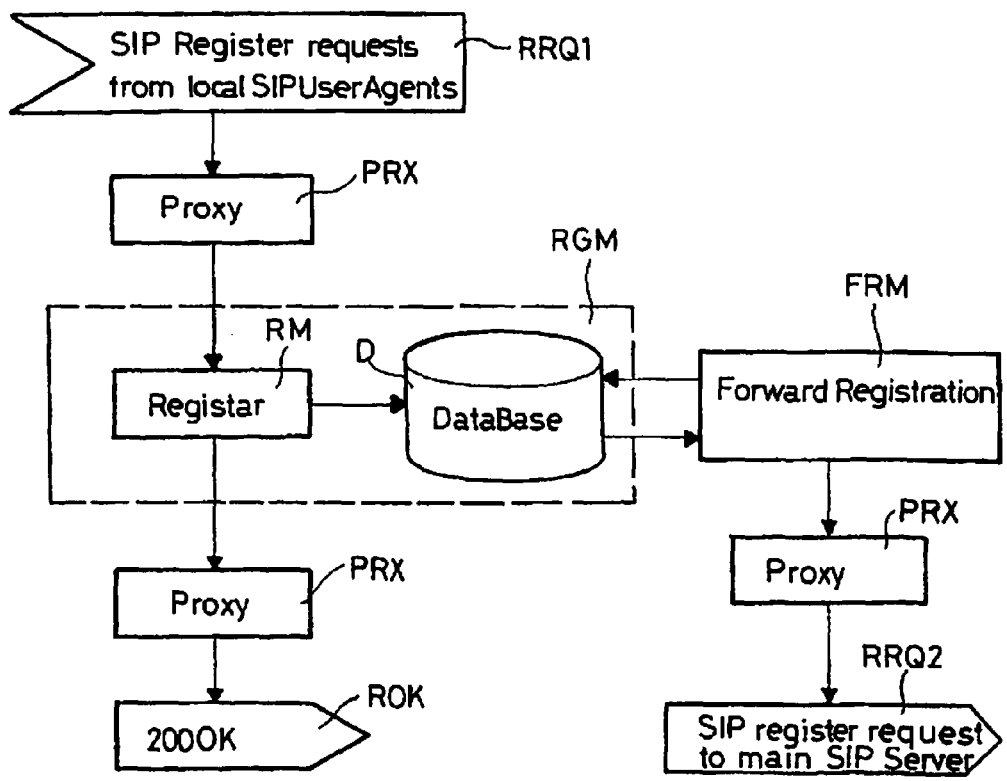
FIG_11
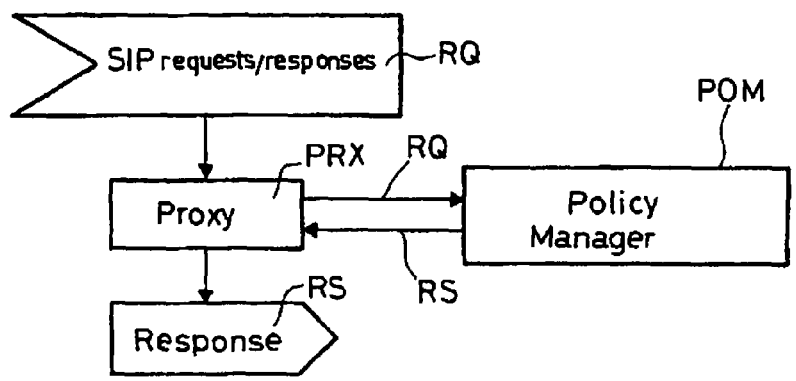

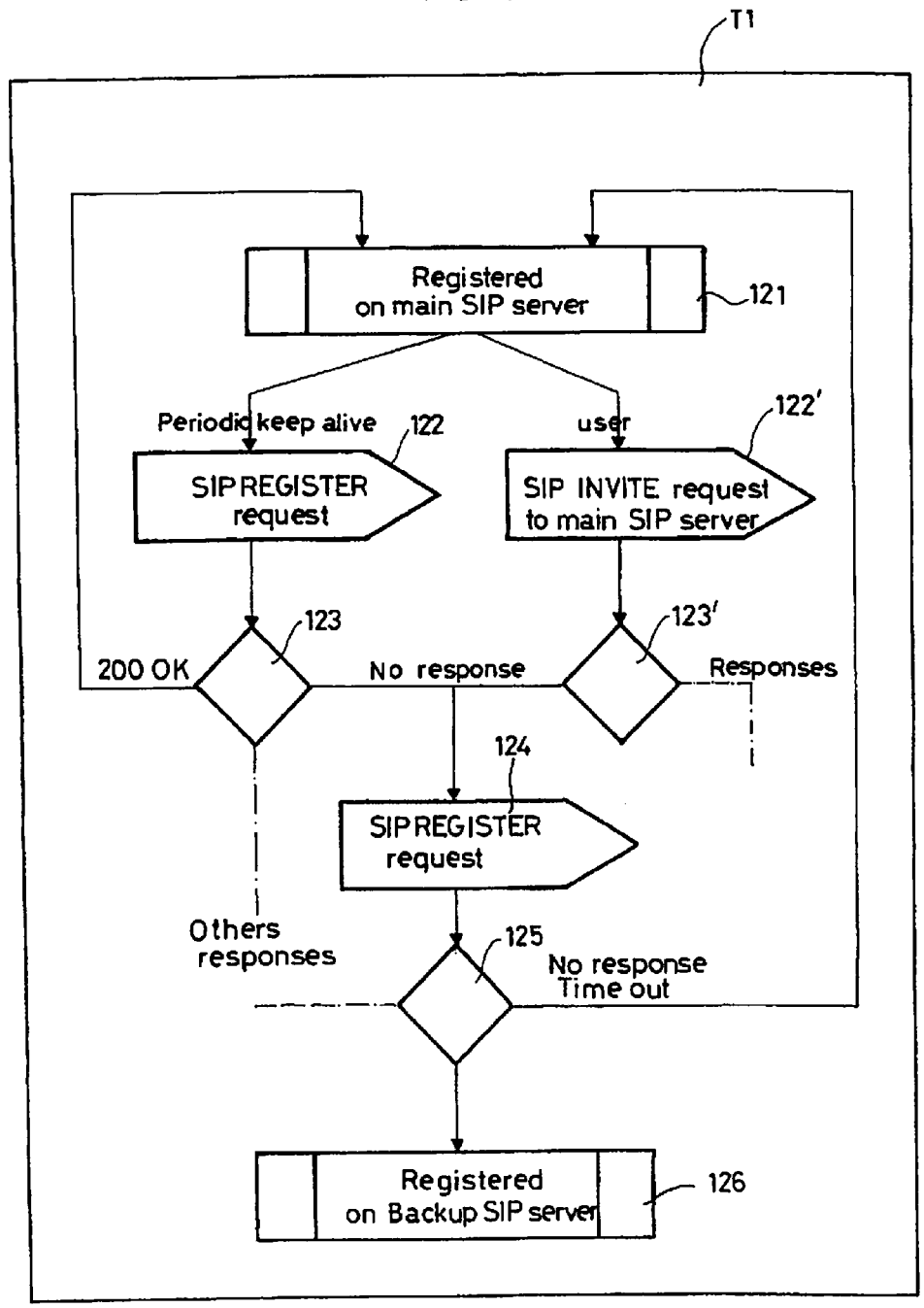

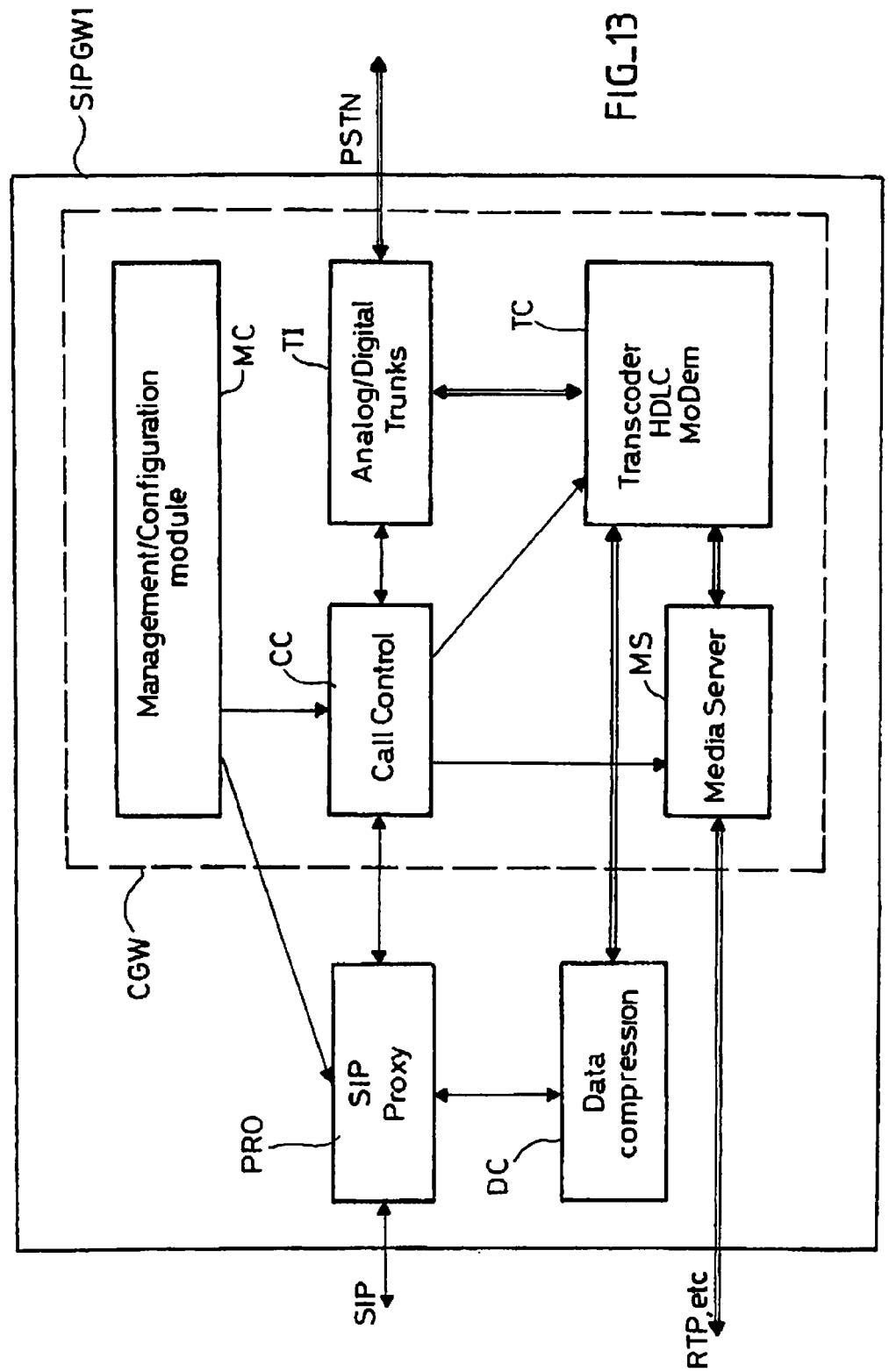
FIG_13

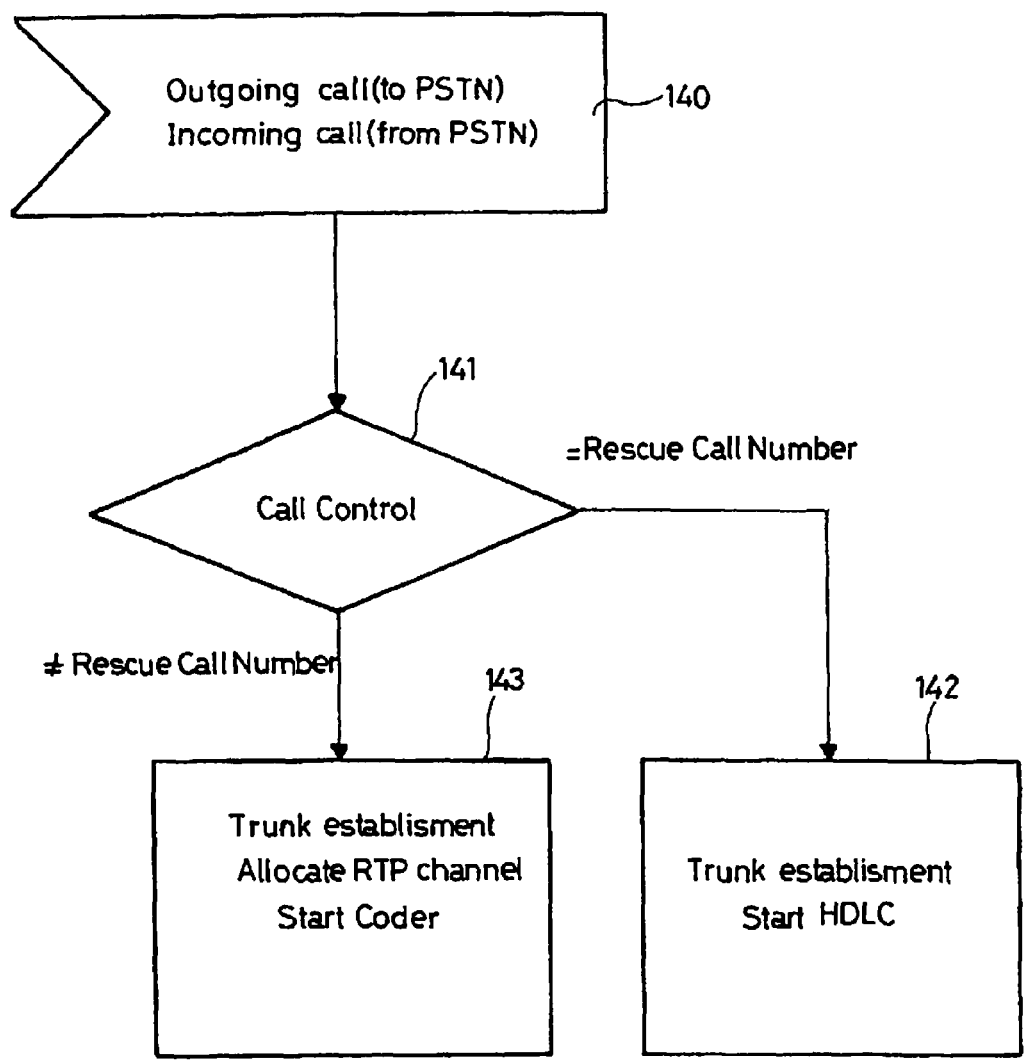
FIG_14

FIG_15
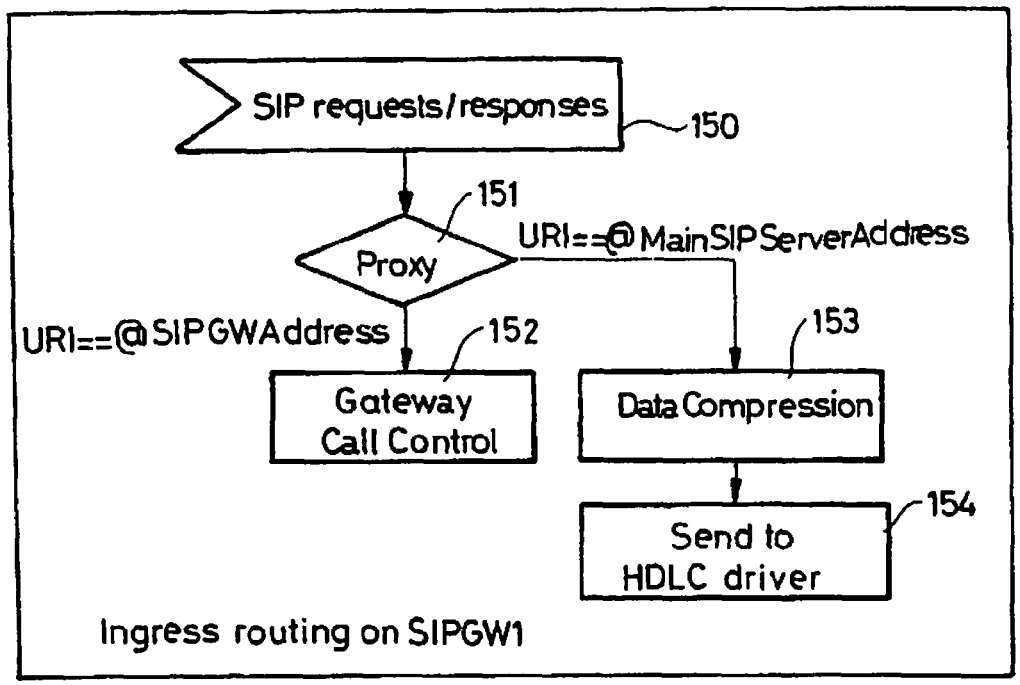
FIG_16
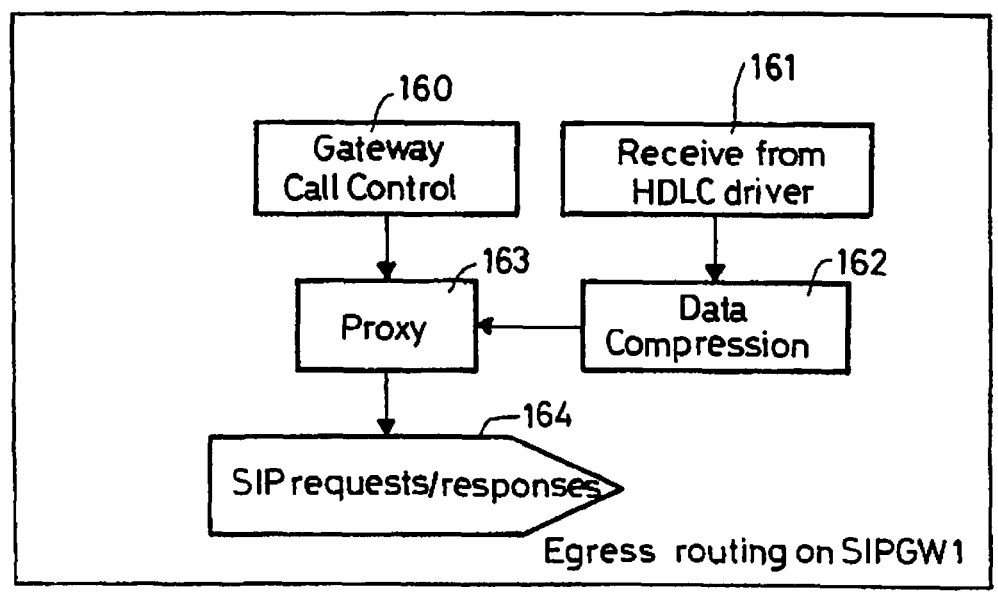

GATEWAY FOR THE SURVIVABILITY OF AN ENTERPRISE NETWORK USING SIP

This is a divisional of and claims priority under 35 U.S.C. §121, 120 on U.S. patent application Ser. No. 14/000,714, filed Aug. 21, 2013, which claims priority to National Phase of PCT/EP2012/051060, filed Jan. 24, 2012, which claims priority to EP 11305279.9 filed Mar. 15, 2011, the entire contents of each of which are incorporated herein by reference.

BACKGROUND OF THE INVENTION

1. Field of the invention

The invention relates to the enterprise telecommunication networks. An enterprise telecommunication network often links terminals that are spread on a plurality of sites, and today it uses the Internet Protocol (IP) and the Session Initiation Protocol (SIP). Voice samples, data packets, and signaling messages are carried by an IP network that is independent of the public telephone switched network (PSTN), though the enterprise network is also linked to the PSTN by a gateway in order to communicate with the world outside the enterprise.

Each SIP terminal runs a SIP User Agent. All the sip user agents are interconnected through an IP network comprising at least one SIP server that acts as a registrar server, a redirect server, a proxy server, and possibly as a presence server, in order to set up telephone communications, and also provide numerous telephony services. For instance: message waiting indications, presence state indications, conference membership notifications, call statistics, messaging . . . Generally an enterprise network comprises a single SIP server, located in a main site of the enterprise, and the terminals of the remote sites communicate with the SIP server of the main site via an IP network.

In case of failure of this IP network, part or totality of the services previously provided by a SIP server in the main site is no longer available in the remote sites.

2. Description of the prior art

Some solutions are known:

Calls may be rerouted to the PSTN but none out of band service information is conveyed through this way—Some local proxy servers may offer specific services in case of loss of the link with the SIP server of the main site, but they do not exchange any information with it as long as the IP network is down; so, all the services hosted in the SIP server of the main site are no longer available in the remote site—Global IP routing through the PSTN, by means of a fully backed up infrastructure. The cost of deployment and the cost of the required bandwidth are very high.

The aim of the present invention is to provide at least some of these telephony services to the SIP terminals located on remote sites, when the IP link to the SIP server of the main site is down, at a reasonable cost.

SUMMARY OF THE INVENTION

The object of the invention is a gateway for the survivability of an enterprise network using session initiation protocol. This gateway collaborates with a backup server for establishing a backup link and exchanging SIP messages with a main SIP server, via the backup link and a similar gateway. It comprises:

a management and configuration module for storing configuration parameters;

A trunk interface module for coupling the gateway to a trunk of the public network;

A media server module coupled to the enterprise network;

A transcoder module for converting the media and/or protocol used in the enterprise network, to the media and/or protocol used in said trunk, and reciprocally;

A call control module for managing a call according to the type of the signalization used by the terminal of a calling party, and for driving the media server module, the transcoder module, and the trunk interface module.

It is characterized in that it further comprises:

data compression means for applying a compression according to the configuration parameters, in order to decrease the size of SIP packets to be sent on the backup link;

and a proxy module comprising means for:

for forwarding each SIP message received by the gateway, according to the IP address contained in a SIP Request-URI message, the SIP message being either sent to the Call Control module if this IP address is the address of the gateway, or to the data compression module if the IP address is the address of the main SIP Server ;

for adding, if the IP address is the address of the main SIP Server, the IP address of the proxy module in the Path header on each SIP Register method;

and, for each other SIP method sent to the main SIP Server, suppressing the IP address of the proxy module in the Route header in the Route header;

and in that:

the management and configuration module comprises:

means for receiving and storing a data compression flag, and means for receiving and storing a rescue call number to be used for establishing the backup link;

the call control module comprises means for starting and stopping resources in the media server modules and the transcoder module depending on the nature of the call whether it is a rescue call for establishing the backup link, or a normal call.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which:

FIG. 1 is a block diagram showing an exemplary enterprise telecommunication network, on a main site and a remote site, comprising two SIP gateways according to the invention.

FIG. 2 illustrates the transmission of a REGISTER message from the SIP user agent of a terminal located in the remote site to a main SIP server located in the main site, for registering the terminal in the main SIP server.

FIG. 3 illustrates the transmission of a SUBSCRIBE message from the SIP user agent of a terminal located in the remote site to the main SIP server located in the main site, for subscribing to message waiting indication.

FIG. 4 illustrates the transmission of a NOTIFY message from the main SIP server located in the main site to the SIP user agent of a terminal located in the remote site, for notifying the terminal that a message is waiting.

FIG. 5 illustrates the transmission of a SUBSCRIBE message from the main SIP server located in the main site to the SIP user agent of a terminal located in the remote site, for subscribing to call statistics publication.

FIG. 6 illustrates the transmission of a PUBLISH message from the SIP user agent of a terminal located in the remote site to the main SIP server located in the main site, for notifying call statistics to the latter.

FIG. 7 is a block diagram showing an embodiment of the backup SIP server.

FIG. 8 illustrates the operations made by a link monitor manager in this embodiment.

FIG. 9 illustrates with more details one of the operations made by the link monitor manager in this embodiment.

FIG. 10 illustrates, with more details, the operations of a forward registration manager in this embodiment.

FIG. 11 illustrates, with more details, the operations of a policy manager in this embodiment.

FIG. 12 illustrates the operations of a classical SIP terminal when it collaborates with an embodiment of the backup SIP server.

FIG. 13 is a block diagram showing an embodiment of the gateway according to the invention.

FIG. 14 illustrates operations made by this embodiment of the gateway according to the invention.

FIGS. 15 and 16 illustrate other operations made by this embodiment of the gateway according to the invention.

DETAILED DESCRIPTION OF THE PREFERRED EMBODIMENTS

The exemplary enterprise network represented on FIG. 1 comprises, on a main site:
SIP terminals such as T2,
Time Division Multiplexing (TDM) terminals such as T4,
a main SIP server MSS,
a router R2,
a SIP gateway SIPGW2 according to the invention;
and on a remote site:
SIP terminals such as T1,
Time Division Multiplexing (TDM) terminals such as T3,
a backup SIP server BSS,
a router R1,
a SIP gateway SIPGW1 according to the invention.

All the network elements of the main site are linked to a local area network LAN2, except the TDM terminals that are linked to the gateway SIPGW2. All the network elements of the remote site are linked to a local area network LAN1, except the TDM terminals that are linked to the gateway SIPGW1.

The routers R1 and R2 are linked by an IP link IPL through an IP network WAN. The SIP gateways SIPGW1 and SIPGW2 are linked by a public switched telephone network PSTN that may be analog or digital. In other embodiments, it may be replaced by a public mobile network.

The SIP gateways SIPGW1 and SIPGW2 are used for calls between TDM terminals and IP or TDM terminals of the enterprise network, and for calls between terminals of the enterprise network and terminals of the network PSTN. In addition, they are used for exchanging SIP signaling messages via the public network PSTN in case the IP link IPL through an IP network WAN the IP network WAN does not work.

Normal Mode:
When the IP network WAN is working, the backup SIP server BSS is on standby. It periodically checks that the IP link IPL is working. The main SIP server MSS acts as a registrar server, a redirect server, and a proxy server, for the users of all the terminals of both sites, for setting up the calls to and from all the terminals of both sites. For instance, when the SIP terminal T1 sets up a session with one of the terminals T2, T3, or T4, its sends SIP signaling message that are forwarded to the main SIP server MSS via the local area network LAN1, the router R1, the IP network WAN, the router R2, and the local area network LAN2. Then the main SIP server MSS forwards the messages to the destination terminal via the local area network LAN2.

Backup Mode:
When the SIP signaling link IPL, through the network WAN, does not work, the backup SIP server BSS or one of the SIP terminals of the remote site, T1 for instance, detects the failure of the link IPL. Then the backup SIP server BSS orders the setup of a backup SIP signaling link BL over the public switched telephone network PSTN (It may be on an analog or digital trunk, according to the configuration of the public switched telephone network PSTN). In other embodiments, the backup link BL may be setup via a mobile network, for instance a third generation mobile network. It may also be a permanent link, for a quicker reactivity in case of interruption of the IP link IPL.

The backup SIP server BSS becomes fully activated to act as a registrar server, a redirect server, and a proxy server, for the users of all the terminals of the remote site. So it accepts the registration of all the terminals of the remote site. This local registration enables the terminals of the remote site to set up local calls between them.

In addition, the backup SIP server BSS forwards their registration requests to the main SIP server MSS, via the backup SIP signaling link BL, in order to keep the main SIP server MSS updated. This registration in the main site enables the terminals of the remote site to set up calls to terminals of the main site, and anywhere else, via the public switched telephone network PSTN.

In addition, the backup SIP signaling link enables the main SIP server MSS to continue to provide at least a part of the services it usually provides to the terminals of the remote site. The backup SIP server BSS can transfer, on the backup SIP signalling link BL, various kinds of SIP signalling information. However it cannot be real time signalling or high bandwidth signalling since the backup SIP signalling link BL is carried by one or a few voice channels of the public switched telecom network PSTN.

According to the invention, the backup SIP server BSS allows only a subset of the services usually provided by the main SIP server MSS to the terminals of the remote site. It allows the services that require signalling information that is compatible with the backup SIP signalling link BL. For allowing or forbidding services, it parses the SIP signalling messages that are sent from the terminals of remote site to the main SIP server, on the main site; and it alters the contents of some fields of these SIP messages, by deleting some information that would be necessary for providing the forbidden services.

On the other hand, it propagates, on the backup SIP signalling channel BL, signalling information necessary for allowed services such as:
SIP device registrations;
Service subscribing from local or remote users, and relevant notifications;
Service messaging;
Contextual data publications.

It may have additional capabilities such as routing feature for local and external calls, local services, conference . . .

For instance, when the SIP terminal T1 on the remote site sends a SIP message addressed to the terminal T2 on the main site, this message is received by the backup SIP server BSS. This latter alters the Allow header field of this message, if necessary, in order to allow only some services; inserts the relevant route headers; and then forwards the message to the main SIP server MSS via the gateway SIPGW1, the backup signaling link BL through the public switched telephone network PSTN, and the gateway SIPGW2. Then the main SIP server MSS forwards the message to the terminal T2.

The FIGS. 2 to 6 illustrate the transmission of different kinds of SIP signaling messages between the SIP user agent of terminal T1 and the main SIP server MSS, and the transmission of the corresponding acknowledgements, in backup mode, for various services.

FIG. 2 illustrates the transmission of a REGISTER message from the SIP user agent of the terminal T1 located in the remote site to the main SIP server MSS located in the main site, for registering the terminal in the main SIP server MSS, in backup mode. When this terminal T1 detects that the IP link IPL with the main SIP server no longer works, it registers to the backup SIP server BSS. The backup SIP server BSS propagates the registration request to the main SIP server MSS via the backup SIP signalling link BL setup over the public switched network PSTN. In the REGISTER message, the backup SIP server BSS may:

rewrite the content of the field "Request-URI" to match the main SIP server registrar URI (Uniform Resource Identifier).

alter the content of the header field "Allow" (that contains a list of "SIP methods" such as SUBSCRIBE, NOTIFY, MESSAGE, PUBLISH, OPTIONS . . . ).

insert the route headers of the corresponding gateway URI SIPGW1 and SIPGW2 according to its configuration.

For instance, if:

BackupSIPServer.com is the URI of the backup SIP server BSS,

MainSIPServer.com is the URI of the main SIP server MSS,

SIPUA@BackupSIPServer.com is the URI of the terminal T1,

SIPUA@IPSIPUA is the contact URI of terminal T1 formed by its IP address, then the terminal T1 sends to the backup SIP server BSS a message:

Register1: registrar.BackupSIPServer.com
From: SIPUA@BackupSIPServer.com
Contact: SIPUA@IPSIPUA
Allow: INVITE, ACK, BYE, REGISTER, SUBSCRIBE, NOTIFY, MESSAGE, PUBLISH,
OPTIONS, . . .

So the terminal T1 has been registered in the backup SIP server BSS, and this latter has indicated that it allows the SIP methods INVITE, ACK, BYE, REGISTER, SUBSCRIBE, NOTIFY, MESSAGE, PUBLISH, OPTIONS . . .

Then the backup SIP server BSS sends, to the gateway SIPGW1 a message:

Register2: registrar. MainSIPServer.com
From: SIPUA@ MainSIPServer.com
Contact: SIPUA@IPSIPUA
Allow: REGISTER, SUBSCRIBE, NOTIFY, MESSAGE, PUBLISH, OPTIONS . . .

In the message Register2, the field "Allow" has been modified by the backup SIP server BSS in order to suppress some SIP methods (INVITE, ACK, etc) among those that were allowed by the terminal T1. The suppressed methods correspond to services (such as establishment of real time media sessions and attached services like transfer, . . . , for instance) that need a real time signalling or a wide band signalling that cannot be supported by the backup SIP signalling link BL. Then the backup SIP server BSS sends an acknowledgement 200ok to the terminal T1.

Then the gateway SIPGW1 sends, to the gateway SIPGW2, via the backup SIP signaling link BL, a message:

Register3:registrar.MainSIPAppliServer.com
From: SIPUA@MainSIPServer.com
Contact: SIPUA@IPSIPUA
Allow: REGISTER, SUBSCRIBE, NOTIFY, MESSAGE, PUBLISH, OPTIONS, . . .
Path: SIPGW1.MainSIPServer.com In the message Register3, a field Path has been added by the gateway SIPGW1 in order to indicate a path towards the backup SIP server BSS, conforming to standard RFC3327.

The gateway SIPGW2 sends, to the main SIP server MSS, a message:

Register4: registrar. MainSIPServer.com
From: SIPUA@ MainSIPServer.com
Contact: SIPUA@IPSIPUA
Allow: REGISTER, SUBSCRIBE, NOTIFY, MESSAGE, PUBLISH$_2$OPTIONS, . . .
Path: SIPGW2. MainSIPServer.com, SIPGW1.MainSIPServer.com The field Path has been completed by the gateway SIPGW2 in order to indicate a full path towards the backup SIP server BSS, conforming to standard RFC3327.

Then the main SIP server MSS sends an acknowledgement message "200ok" to backup SIP server BSS via the gateway SIPGW2 and the gateway SIPGW 1.

The backup SIP server according to the invention also enables service subscribing from the remote site. In the following examples, the backup SIP server BSS shall alter the relevant headers, including the Route header when needed.

Examples of services:

a) Message waiting indication (see FIGS. 3 and 4): Each user located on the remote site can use a Voice Mail service located in the main SIP server MSS. This service notifies the user with the state of his/her mailbox, in whatever mode (normal/backup) the system is. For such purpose, after registration of a terminal, the backup SIP server BSS propagates the relevant subscribe request (Message Waiting Indication EventPackage) to the main SIP server MSS. Upon any significant change of the user's voice mailbox state, relevant notification shall be sent from the main SIP server MSS and propagated to the corresponding user. An application or equipment can use this notification to inform the user through an appropriate way (Popup window, icon, blinking LED, tone . . . )

b) Resource presence state: SIP devices of the remote site may display global resource state information (remote user presence state, services availability as Voicemail services . . . ). For such a purpose, a SIP user agent sends a subscribe request (Presence Event Package) to the backup SIP server BSS. This latter forwards such requests to the main SIP server MSS and processes subsequent notifications to the corresponding user agents.

c) Conference membership notification: A SIP user agent may participate to a conference hosted by a conference server in the main SIP server MSS, and require the respective presence states of all participants, through a subscribe request (Conference Event Package) to the backup SIP server BSS which shall forward such requests and shall process subsequent notifications.

FIG. 3 illustrates the transmission of a SUBSCRIBE message from the SIP user agent of the terminal T1 located in the remote site to the main SIP server MSS located in the main site, for subscribing to the service called "message waiting indication", in backup mode.

The terminal T1 sends, to the backup SIP server BSS, a message:
Subscribe1:SIPUA@vmail.BackupSIPServer.com
From: SIPUA@BackupSIPServer.com
Event: message-summary
where SIPUA@vmail.BackupSIPServer.com is the URI of the Voice Mail service attached to Terminal 1 in Backup mode,
and where SIPUA@BackupSIPServer.com is the URI of Terminal 1 in Backup mode.

Then the backup SIP server BSS sends, to the gateway SIPGW1, a message:
Subscribe2:SIPUA@vmail.MainSIPServer.com
From: SIPUA@MainSIPServer.com
Route: SIPGW1.MainSIPServer.com, SIPGW2.MainSIPServer.com
Event: message-summary In the message Subscribe2, a field Route has been added by the gateway SIPGW1 for routing the message to the main SIP server MSS.

Then the gateway SIPGW1 sends, to the gateway SIPGW2, via the public switched telephone network PSTN, a message:
Subscribe3:SIPUA@vmail.MainSIPServer.com
From: SIPUA@MainSIPServer.com
Route: SIPGW2.MainSIPServer.com
Event: message-summary In the message Subscribe3, the header field Route has been altered by the gateway SIPGW1 by suppressing the URI of the SIP Gateway SIPGW1 which has just been crossed.

Then the gateway SIPGW 2 sends, to the main SIP server MSS a message:
Subscribe4:SIPUA@vmail.MainSIPServer.com
From: SIPUA@MainSIPServer.com
Event: message-summary In the message Subscribe4, the field Route has been altered by the gateway SIPGW2 by suppressing the URI of the SIP Gateway SIPGW2 which has just been crossed.

Then the main SIP server MSS sends an acknowledgement message "200ok" to the terminal T1 via the gateway SIPGW2, the public switched telephone network PSTN, the gateway SIPGW1, and the backup SIP server BSS.

The backup SIP server according to the invention enables publications and notification from the remote side.

a) Publications (An example will be described below with reference to FIG. 6)

Presence state publication (RFC 3856 and PUBLISH method):

Devices of the main site (Conference servers, messaging applications, routing . . . ) may need Presence state information relative to the users located in the remote site. These presence data are conveyed from user agents in the remote site to a Presence agent associated to main SIP server MSS, via the backup SIP server BBS and the backup SIP signalling link.

Call statistics publication (PUBLISH method):

Some devices of the main site (Billing application, conference servers, routing, voice quality system monitoring . . . ) need permanent call statistics information. These call statistics are conveyed from user agents in the remote site to a Call Statistics agent associated to main SIP server MSS, via the backup SIP server BBS and the backup SIP signalling link.

b) Notifications (An example will be described below with reference to FIG. 4)

Call statistic notifications: according to RFC6035, the subscribe/notify mechanism may also be used in such a case.

Call Terminated notification: An automatic redial feature using Dialog

Event Package (RFC4235) may be invoked by a user A located on the main site, as this user A is trying to contact a user B located on the remote site and that is busy. A notification of call termination is forwarded to the main SIP server MSS when the user B becomes available, in order to allow an automatic redial for the user A.

FIG. 4 illustrates the transmission of a NOTIFY message from the main SIP server MSS located in the main site to the SIP user agent of the terminal T1 located in the remote site, for notifying the terminal T1 that a message is waiting, in backup mode.

The main SIP server MSS sends, to the gateway SIPGW2, a message:
Notify1:SIPUA@MainSIPServer.com
From: SIPUA@MainSIPServer.com
Route: SIPGW2.MainSIPServer.com, SIPGW1.MainSIPServer.com
Event: message-summary
Messages-Waiting: yes The main SIP server MSS adds a field Route for routing the message to the backup SIP server BSS.

Then the gateway SIPGW2 sends, to the gateway SIPGW1, via the public switched telephone network PSTN, a message:
Notify2:SIPUA@MainSIPServer.com
From: SIPUA@MainSIPServer.com
Route: SIPGW1.MainSIPServer.com
Event: message-summary
Messages-Waiting: yes The gateway SIPGW2 modifies the field Route in the message Notify2, by suppressing the URI of the SIP gateway SIPGW2 which has just been crossed.

Then the gateway SIPGW1 sends, to the backup SIP server BSS, a message
Notify3:SIPUA@MainSIPServer.com
From: SIPUA@MainSIPServer.com
Event: message-summary
Messages-Waiting: yes The gateway SIPGW1 modifies the field Route in the message Notify3, by suppressing the URI of the SIP gateway SIPGW1 which has just been crossed.

Then the backup SIP server BSS sends, to the terminal T1, a message
Notify4:SIPUA@BackupSIPServer.com
From: SIPUA@BackupSIPServer.com
Event: message-summary
Messages-Waiting: yes Then the terminal T1 sends an acknowledgement message "200ok" to the main SIP server MSS via the backup SIP server BSS, the gateway SIPGW1, the public switched telephone network PSTN, and the gateway SIPGW2.

The backup SIP server according to the invention enables subscription from the main site.

FIG. 5 illustrates the transmission of a SUBSCRIBE messages from the main SIP server MSS located in the main site to the SIP user agent of a terminal T1 located in the remote site, for subscribing to call statistics publication, in backup mode.

The main SIP server MSS sends to the gateway SIPGW2 a message:
Subscribe1:SIPUA@MainSIPServer.com
From: callStat@MainSIPServer.com
Route: SIPGW2.MainSIPServer.com,
SIPGW1.MainSIPServer.com
Event: vq-rtcpxr In the message Subscribe1, the main SIP sever MSS adds a field Route for routing the message to the backup SIP server BSS.

Then the gateway SIPGW2 sends, to the gateway SIPGW1, via the public switched telephone network PSTN, a message:
Subscribe2: SIPUA@MainServer.com
From: callStat@MainSIPServer.com
Route: SIPGW1.MainSIPServer.com
Event: vq-rtcpxr Where callStat@MainSIPServer.com is the URI of the call statistics publication service.

Then the gateway SIPGW1 sends, to the backup SIP server BSS, a message:
Subscribe3: SIPUA@MainSIPServer.com
From: callStat@MainSIPServer.com
Event: vq-rtcpxr Then the backup SIP server BSS sends, to the terminal T1, a message:
Subscribe4: SIPUA@BackupSIPServer.com
From: callStat@BackupSIPServer.com
Event: vq-rtcpxr Then the terminal T1 sends an acknowledgement message "200ok" to the main SIP server MSS via the backup SIP server BSS, the gateway SIPGW1, the public switched telephone network PSTN, and the gateway SIPGW2.

The backup SIP server according to the invention enables publications from the remote side.

FIG. 6 illustrates the transmission of a PUBLISH message from the SIP user agent of the terminal T1 located in the remote site to the main SIP server MSS located in the main site, for notifying call statistics to the latter, in backup mode. Terminal T1 sends, to the backup SIP server BSS, a message:
Publish1: SIPUA@BackupSIPServer.com
From: SIPUA@BackupSIPServer.com
Event: vq-rtcpxr Then the backup SIP server BSS sends, to the gateway SIPGW1 a message
Publish2:SIPUA@MainSIPServer.com
From: SIPUA@MainSIPServer.com
Route: IPGW1.MainSIPServer.com,
SIPGW2.MainSIPServer.com
Event: vq-rtcpxr The backup SIP server BSS adds a field Route for routing the message to the main SIP server MSS.

Then the gateway SIPGW1 sends, to the gateway SIPGW2, via the public switched telephone network PSTN, a message:
Publish3:SIPUA@MainSIPServer.com
From: SIPUA@MainSIPServer.com
Route: SIPGW2.MainSIPServer.com
Event: vq-rtcpxr Then the SIP gateway SIPGW2 sends to the main SIP server MSS, a message:
Publish4: SIPUA@MainSIPServer.com
From: SIPUA@MainSIPServer.com
Event: vq-rtcpxr Then the main SIP server MSS sends an acknowledgement message "200ok" to the terminal T1 via the gateway SIPGW2, via the public switched telephone network PSTN, the gateway SIPGW1, and the backup SIP server BSS.

FIG. 7 is a block diagram showing an embodiment BSS of the backup SIP server according to the invention. It comprises:
- a management and configuration module MMC;
- a classical SIP server CSS;
- and a backup application server BAS for implementing the backup operations according to the invention.

The classical SIP server CSS comprises a registrar module RGM and a proxy server PRX. The backup application server BAS comprises:
- a forward registration manager FRM that duplicates and sends to the main SIP server MSS, via the proxy PRX, the registration data that are being written into the registrar module RGM;
- a policy manager POM that checks the "SIP methods" (INVITE, ACK, BYE, REGISTER, SUBSCRIBE, NOTIFY, MESSAGE, PUBLISH, OPTIONS, . . . ) indicated in a message being sent by a terminal, for keeping or deleting each of these methods in the message before forwarding the message to the main SIP server MSS;
- and a link monitor manager LMM that monitors the IP link IPL carried by the IP network WAN. If it detects any failure of the IP link IPL, it enables the registrar module RGM of the backup SIP server BSS for registering the local terminals, and it sets up a backup SIP signaling channel BL via the public switched telephone network PSTN. The signaling information concerning services is forwarded to the main SIP server MSS, whereas the signaling concerning voice is dealt with by the backup SIP server BSS.

Examples of methods selected by the policy manager POM:
INVITE:
  Non media session (Case Content-Type header < > sdp: depends on Content-Length header): cf media type description (http://www.iana.org/assignments/media-types)
  Media session (Content-Type header: application/sdp): NO
  Content-Type absent: NO (supposed to be SDP in Ack, . . . )
CANCEL:
BYE:
ACK:
  If from a non media session: YES
  Otherwise: no
REFER: NO
REGISTER: YES
SUBSCRIBE/NOTIFY: Depends on Event header contents; may also depend on the Content-Length header value:
  Message-summary : YES (rfc3842)
  vq-rtcpxr: YES (rfc6035)
  presence: YES (rfc3856)
  winfo: YES (rfc3857)
  dialog: YES (rfc4235)
  conference: YES (rfc4575)
  . . . (list is not exhaustive)

MESSAGE: depends on the Content-Length value (and the rate : all data may not be transmitted if traffic is too important)

OPTIONS: YES

INFO: depends on the Content-Length value and the rate

PUBLISH: if Event header is accepted (rfc3903)

Some priorities may also be associated to methods, events or users (SDP invite might be authorized for a determined user or with a determined low priority), depending on the value and the capacity of the backup signalling link, the transfer may whether or not be guaranteed.

FIG. 8 illustrates the operations made by the link monitor manager LMM in the backup application server BAS:

Step 81: At initialization, the backup SIP server BSS is on standby, i. e. its port is closed.

Step 82: The link monitor manager LMM periodically sends a keep-alive message to the main SIP server MSS via the IP network WAN, in order to detect a possible default of the IP link through the network WAN.

Step 83: Then the link monitor manager LMM checks whether it receives a response from the main SIP server MSS via the IP network WAN. If it receives a response, it continues to keep the backup SIP server BSS on standby (Return to step 81).

Step 84: If it does not receive a response, the link monitor manager LMM activates the backup SIP server BSS in order to forward the registration requests to the main SIP server MSS.

Step 85: Then the link monitor manager LMM awaits a recovery of the IP network WAN: It periodically sends a keep-alive message to the main SIP server MSS via the IP network WAN.

Step 86: Then the link monitor manager LMM checks whether it receives a response from the main SIP server MSS via the IP network WAN. If it does not receive a response, the backup SIP server remains active (Return to step 84).

Step 87: If it receives a response from the main SIP server MSS via the IP network WAN, i. e. if the IP link IPL carried by IP network WAN is working again, it unregisters the SIP user agents that it had registered locally, and then puts the backup SIP server BSS back to standby state (Return to step 81).

FIG. 9 illustrates, with more details, the step 84 made by the link monitor manager LMM in the backup application server BAS. If it does not receive a response, the link monitor manager LMM activates the backup SIP server BSS:

Step 91: It activates the register module RGM so that it accepts to register the users of the terminals, of the remote site, which request registration.

Step 92: Then it sends a SIP message INVITE to the gateway SIPGW1, for requesting it to setup a call to the gateway SIPGW2 via the public network PSTN, to set up the backup SIP signaling link BL.

Step 93: If the gateway SIPGW1 responds negatively or does not respond, the link monitor manager LMM tries again (Return to step 92).

Step 94: If the gateway SIPGW1 responds positively, a backup SIP signaling link BL is now available via the public switched telephone network PSTN. Then the link monitor manager LMM proceeds to the step 85.

FIG. 10 illustrates, with more details, the operations of the forward registration manager FRM:

When the SIP user agent of a SIP terminal, located in the remote site, sends a SIP register request RRQ1, via the proxy PRX, this request is locally dealt with by the forward registration manager FRM. If the backup SIP server BSS is activated:

The forward registration manager FRM forwards the registration request by sending a SIP register request message RRQ2 to the main SIP server MSS, via the proxy PRX. Then the main SIP server MSS acknowledges that it has registered the user. Then the forward registration manager FRM stores, in a data base D that is part of the registrar module RGM, an indication that the main SIP server MSS has registered the user.

The forward registration manager FRM allows a local registration, in a registrar memory RM that is part of the registrar module RGM, and allows the sending of an acknowledgement message ROK, 200ok, to the terminal that sent the register request RRQ1.

FIG. 11 illustrates, with more details, the operations of the policy manager POM: All the requests that transit through the proxy PRX are dealt with by the policy manager POM. When the SIP user agent of a SIP terminal, located in the remote site, sends a SIP request RRQ1, via the proxy PRX, the policy manager POM supplies a response RS, to the proxy PRX, that may be one of the following ones according to predetermined rules:

Continue treatment without modification (for instance for a local call, or a mere phone call via the public network PSTN).

Negative response (For instance refusing a video call via the public switched telephone network PSTN because the available bandwidth is insufficient, or refusing a service that needs a real time signaling that the public switched telephone network PSTN cannot support).

Forward the request to its destination (with header modifications).

No action (For instance, on FIG. 2, there is no action done when the backup SIP server BSS receives the message 200ok, because the message Register1 has already been acknowledged previously by sending a message 200ok to the terminal T1).

It is possible to use classical SIP terminals, without any modification in these SIP terminals, when a backup SIP server according to the invention is installed in an enterprise network.

FIG. 12 illustrates the operations of a classical SIP terminal T1 located in the remote site, when it collaborates with an embodiment of the backup SIP server according to the invention. This terminal stores the address of a main SIP server and the address of a backup SIP server.

Step 121: The terminal is in its initial state. Generally, in this initial state, the terminal has been previously registered on the main SIP server.

Step 122: The terminal periodically sends a SIP message, REGISTER, requesting a registration on any SIP server.

Step 123: Then it checks that the main SIP server responds. If the main SIP server responds, then the terminal stays in its initial state (Return to step 121), or continues the normal steps of a call if a call is ongoing.

Step 122': Between two periodic automatic checking, the user of the terminal may attempt to make a call while the IP link with the main SIP server does not work anymore. The attempt triggers the sending of a SIP message, INVITE, addressed to the main SIP server.

Step 123': Then the terminal checks that the main SIP server responds. If the main SIP server responds, then the terminal continues the normal steps of a call.

Step 124: If the main SIP server does not respond, the terminal sends a SIP message, REGISTER, in order to be registered on the backup SIP server (For instance the backup SIP server BSS described above).

Step 125: Then it checks whether a SIP server responds. If the backup SIP server has responded within a predetermined time interval, the terminal goes back to in its initial state (Return to step 121) in order to continue to periodically send a SIP message, REGISTER, requesting a registration on the main SIP server.

Step 126: If the backup SIP server has responded that it has registered the terminal, then the terminal enters into a new state "Registered on backup SIP server". It can benefit from the backup SIP server for using services hosted by the main SIP server.

FIG. 13 is a block diagram showing an embodiment SIPGW1 of the gateway according to the invention. The peer gateway SIPGW2 located in the main site is similar. This embodiment SIPGW1 comprises a classical gateway CGW, a proxy PRO and a data compression module DC. The classical gateway CGW comprises:

- A management and configuration module MC that stores parameters such as the parameters of IP interfaces, SIP and trunk layers, and route configuration.
- An analog or digital trunk interface module TI for coupling the gateway to a trunk of the public network PSTN. Its type depends on the type of trunk.
- A media Server module MS coupled to the enterprise network: It is located on the IP network side, and manages the RTP/RTCP/T38 . . . flows.
- A transcoder module TC: It comprises several types of transcoding resources, such as audio coders, a HDLC (High-Level Data Link Control) transcoder, and a modem, in order to convert the protocol used in the enterprise IP network protocol, for the data payload, to the protocol used in a trunk of the public network PSTN, and reciprocally.
- A call control module CC: It manages a call according to the type of the signalization (SIP, Q931, analog . . . ) used by the terminal of a calling party, and it drives the Media Server module MS, the transcoder module TM, and the trunk module TM.

The use of the backup SIP server BSS implies modification of the management and configuration module MC and of the call control module CC of the classical gateway CGW. The management and configuration module MC is modified in order to receive and store the following parameters:

- A rescue call number that will be used for establishing the backup link BL.
- A data compression flag (to enable/disable compression).
- Value of the bandwidth of the backup link BL (optional).

The call control module CC is modified so as to start (respectively stop) the relevant HDLC resources of the transcoder module TC in case the called number matches the rescue call number (instead of starting (respectively stopping) resources of media server MS and audio coder resources of the transcoder module TC, as it is normally done for any other call).

The proxy module PRO forwards each SIP message according to the IP address contained in a SIP Request-URI. The SIP message is either sent to the Call Control module CC if its IP address is the address of the gateway SIPGW1 (normal ISDN call), or to the Data compression module DC if the IP address is the address of the main SIP Server MSS. In the latter case the proxy adds its own IP address in Path header on each register method. For each other SIP method sent to the Main SIP Server MSS, the proxy PRO suppresses its own IP address in the Route header. The data compression module DCM applies a compression according to the configuration parameters, in order the decrease the size of SIP packets, thus increasing the maximal signalling data rate on the backup link BL.

FIG. 14 illustrates operations made by this embodiment of the gateway according to the invention for call establishment on the SIP Gateway SIPGW1 (and SIPGW2). There are two types of calls managed by the gateway SIPGW1:

- Basic outgoing/incoming calls used from/to a local phone in order to make a voice call.
- An outgoing rescue call, based on the rescue call number, when the call control module CCM must establish a back up link BL for the SIP signalling data.

There are two types of calls managed by the gateway SIPGW2:

- Basic outgoing/incoming calls used from/to a local phone in order to make a voice call.
- An incoming rescue call, based on the rescue call number, when the call control module CCM of SIPGW1 must establish a back up link BL for the SIP signalling data.

Step 140: The call control module CC receives a request to set up an outgoing call (SIPGW1)/incoming call (SIPGW2) to/from the public network PSTN.

Step 141: The call control module CC checks the called number, on the outgoing/incoming call establishment request.

Step 142: If the number matches the rescue call number, then the call control module CC sets up a backup link BL supporting the HDLC protocol.

Step 143: If the number does not match the rescue call number, then the call control module CC sets up a classical voice link supporting a RTP (Real Time Transport) protocol on the side of the enterprise network, and starts the data transcoding in the transcoder module TC.

FIG. 15 illustrates operations made by this embodiment SIPGW1 of the gateway according to the invention, for sending SIP requests and responses to the main site:

Step 150: A SIP message originating from the remote site is received by the proxy PRO of the gateway SIPGW1.

Step 151: The proxy PRO checks the content of its destination URI (request-URI or identified destination for a SIP response message):

Step 152: If URI=XXX@SIPGWAddress, the proxy PRO forwards the message directly to the call control module CC of the gateway SIPGW1.

Step 153: If URI=XXX@MainSIPGServerAddress, the proxy PRO forwards the message to data compression module DC, in order to save bandwidth on the backup link BL.

Step 154: Then the compressed message is sent to the transcoder module TC (HDLC coder) of the gateway SIPGW1, in order to transmit the compressed message via the PSTN network, on the backup link BL.

FIG. 16 illustrates operations made by both the SIPGW1 in remote site and the peer gateway SIPGW2 in the main site for processing SIP egress traffic. The proxy may receive SIP requests or responses from the local network, or from the remote entity (either in the main site or in the local site) via the public network PSTN:

Step 160: The gateways SIPGW1/SIPGW2 receive SIP a request or response from the local network.

Step 161: The gateways SIPGW1/SIPGW2 receive SIP a request or response from the remote site via the public network PSTN.

Step 162: In this latter case, an HDLC driver receives compressed data, forwards them to a decompression module. The decompression module decompresses the data to reconstitute a SIP message and transmits the SIP message to the proxy of the gateway.

Step 163: The proxy receives the SIP message.

Step 164: The proxy forwards the SIP message to its destination in its local network (BSS for SIPGW1 and main SIP server MSS for SIPGW2).

There is claimed:

1. A session initiation protocol (SIP) gateway for survivability of an enterprise network using session initiation protocol (SIP), the enterprise network including a main site and at least one remote site, the main site including a main SIP server (MSS) and the at least one remote site including a backup SIP server (BSS), the main site and the at least one remote site being configured to exchange SIP signaling messages via an Internet protocol link (IPL) through an Internet protocol network (WAN); the main site including a main site SIP gateway; the at least one remote site including a remote site SIP gateway; the SIP gateway being one of the main site SIP gateway and the remote site SIP gateway; the SIP gateway comprising:
   a management and configuration module (MC) configured to,
      store configuration parameters,
      receive and store a data compression flag, and
      receive and store a rescue call number to be used for establishing a backup link (BL);
   a trunk interface module (TI) configured to couple the SIP gateway to a trunk of a public network (PSTN);
   a media server module (MS) coupled to the enterprise network;
   a transcoder module (TC) configured to perform at least one of,
      converting a media used in the enterprise network, to a media used in the trunk, and
      converting a protocol used in the enterprises network to a protocol used in the trunk;
   a call control module (CC) configured to,
      manage a call according to a type of a signalization used by a terminal of a calling party,
      drive the media server module (MS), the transcoder module (TC), and the trunk interface module (TI), and
      start and stop resources in the media server modules (MS) and the transcoder module (TC) depending on weather the call is a rescue call for establishing the backup link (BL) or normal call;
   data compression means (DC) configured to apply a compression according to the configuration parameters, to decrease a size of SIP packets to be sent on the backup link (BL); and
   a proxy module (PRO) configured to,
      forward each SIP message received by the SIP gateway, according to an IP address contained in a SIP Request-Uniform Resource Identifier (URI) message, each SIP message being sent to one of,
         the Call Control module (CC) if the IP address included in the SIP message is an address of the SIP gateway, or
         the data compression module (DC) if the IP address included in the SIP message is an address of the main SIP Server (MSS);
      add the IP address in a Path header on each SIP Register method, if the IP address is the address of the main SIP server (MSS); and
      suppress the IP address of the proxy module in a Route header in the Route header, for each other SIP method sent to the main SIP Server (MSS).

2. The gateway according to claim 1, wherein the management and configuration module (MC) is further configured to receive and store a value of a bandwidth of the backup link (BL).

* * * * *